United States Patent
Zerbini et al.

(10) Patent No.: US 7,678,599 B2
(45) Date of Patent: Mar. 16, 2010

(54) PROCESS FOR THE FABRICATION OF AN INERTIAL SENSOR WITH FAILURE THRESHOLD

(75) Inventors: Sarah Zerbini, Fontanellato (IT); Angelo Merassi, Vigevano (IT); Guido Spinola Durante, Gavirate (IT); Biagio De Masi, Corsano (IT)

(73) Assignees: STMicroelectronics S.r.l., Agrate Brianza (IT); Nokia Corporation, Espoo (FI)

( * ) Notice: Subject to any disclaimer, the term of this patent is extended or adjusted under 35 U.S.C. 154(b) by 664 days.

(21) Appl. No.: 11/566,590

(22) Filed: Dec. 4, 2006

(65) Prior Publication Data

US 2007/0175865 A1 Aug. 2, 2007

Related U.S. Application Data (63) Continuation of application No. 10/650,275, filed on Aug. 27, 2003, now abandoned.

(30) Foreign Application Priority Data

Aug. 30, 2002 (EP) ................................ 02425539

(51) Int. Cl.
*H01L 21/00* (2006.01)
(52) U.S. Cl. ............................... 438/48; 438/52; 438/17
(58) Field of Classification Search .................... 438/48, 438/52, 17
See application file for complete search history.

(56) References Cited

U.S. PATENT DOCUMENTS

| | | | | |
|---|---|---|---|---|
| 6,746,891 B2 * | 6/2004 | Cunningham et al. | ......... | 438/52 |
| 6,794,728 B1 * | 9/2004 | Kithil | ......................... | 257/532 |
| 6,858,810 B2 * | 2/2005 | Zerbini et al. | ............. | 200/61.08 |
| 6,876,047 B2 * | 4/2005 | Cunningham et al. | ........ | 257/415 |
| 6,876,482 B2 * | 4/2005 | DeReus | ..................... | 359/290 |
| 6,917,086 B2 * | 7/2005 | Cunningham et al. | ........ | 257/415 |
| 7,064,637 B2 * | 6/2006 | Tactic-Lucic et al. | ......... | 335/78 |
| 7,299,538 B2 * | 11/2007 | Tactic-Lucic | ................ | 29/622 |
| 7,350,424 B2 * | 4/2008 | Hjelt et al. | ............. | 73/862.041 |
| 7,467,552 B2 * | 12/2008 | MacGugan | ................... | 73/493 |
| 7,528,691 B2 * | 5/2009 | Wallis et al. | ................... | 335/78 |
| 7,545,622 B2 * | 6/2009 | Morris et al. | ............... | 361/290 |
| 2004/0121504 A1 * | 6/2004 | Zerbini et al. | ................. | 438/48 |
| 2004/0188785 A1 * | 9/2004 | Cunningham et al. | ........ | 257/415 |
| 2005/0132814 A1 | 6/2005 | Satou et al. | | |
| 2006/0201248 A1 * | 9/2006 | Unno | ...................... | 73/504.12 |

(Continued)

FOREIGN PATENT DOCUMENTS

DE 10005562 9/2001

(Continued)

*Primary Examiner*—Laura M Menz
(74) *Attorney, Agent, or Firm*—Lisa K. Jorgenson; Harold H. Bennett, II; Seed IP Law Group PLLC (57) ABSTRACT

A process for the fabrication of an inertial sensor with failure threshold includes the step of forming, on top of a substrate of a semiconductor wafer, a sample element embedded in a sacrificial region, the sample element configured to break under a preselected strain. The process further includes forming, on top of the sacrificial region, a body connected to the sample element and etching the sacrificial region so as to free the body and the sample element. The process may also include forming, on the substrate, additional sample elements connected to the body.

33 Claims, 8 Drawing Sheets

U.S. PATENT DOCUMENTS

| | | | |
|---|---|---|---|
| 2007/0101812 A1* | 5/2007 | MacGugan | 73/493 |
| 2007/0158775 A1* | 7/2007 | Cunningham et al. | 257/467 |
| 2007/0175865 A1* | 8/2007 | Zerbini et al. | 216/100 |
| 2008/0148847 A1* | 6/2008 | Sato et al. | 73/504.12 |
| 2008/0184770 A1* | 8/2008 | Sato | 73/1.37 |
| 2008/0257042 A1* | 10/2008 | Tateyama et al. | 73/504.12 |
| 2008/0314145 A1* | 12/2008 | Sato | 73/504.16 |

FOREIGN PATENT DOCUMENTS

| | | |
|---|---|---|
| WO | 9809174 | 3/1998 |

\* cited by examiner

PROCESS FOR THE FABRICATION OF AN INERTIAL SENSOR WITH FAILURE THRESHOLD

BACKGROUND OF THE INVENTION

1. Field of the Invention

The present invention relates to a process for the fabrication of an inertial sensor with failure threshold.

2. Description of the Related Art

As is known, modern techniques of micromachining of semiconductors can be advantageously exploited for making various extremely sensitive and precise sensors, having further small overall dimensions. The so-called MEMS sensors (or micro-electro-mechanical-system sensors), are sensors that can be integrated in a semiconductor chip and are suitable for detecting various quantities. In particular, both linear and rotational MEMS accelerometers with capacitive unbalancing are known. In brief, these accelerometers are normally provided with a fixed body and of a mobile mass, both of which are conductive and are capacitively coupled together. In addition, the capacitance present between the fixed body and the mobile mass may vary, and its value depends upon the relative position of the mobile mass with respect to the fixed body. When the accelerometer is subjected to a stress, the mobile mass is displaced with respect to the fixed body and causes a variation in the coupling capacitance, which is detected by a special sensing circuit.

As mentioned previously, MEMS accelerometers are extremely sensitive and precise; however, they are not suitable for being used in many applications, mainly because they are complex to make and their cost is very high. On the one hand, in fact, the processes of fabrication involve the execution of numerous non-standard steps and/or the use of non-standard substrates (for example, SOI substrates); on the other hand, it is normally necessary to provide feedback sensing circuits based upon differential charge amplifiers, the design of which frequently involves some difficulties.

In addition, in many cases the precision of capacitive MEMS sensors is not required and, indeed, it is not even necessary to have an instantaneous measurement of the value of acceleration. On the contrary, it is frequently just necessary to verify whether a device incorporating the accelerometer has undergone accelerations higher than a pre-set threshold, normally on account of impact. For example, the majority of electronic devices commonly used, such as cell phones, are protected by a warranty, which, however, is no longer valid if any malfunctioning is due not to defects of fabrication but to an impact consequent on the device being dropped onto an unyielding surface or in any case on a use that is not in conformance with the instructions. Unless visible damage is found, such as marks on the casing or breaking of some parts, it is practically impossible to demonstrate that the device has suffered damage that invalidates the warranty. On the other hand, portable devices, such as cell phones, exactly, are particularly exposed to being dropped and consequently to getting broken, precisely on account of how they are used.

Events of the above type could be easily detected by an inertial sensor, which is able to record accelerations higher than a pre-set threshold. However, the use of MEMS accelerometers of a capacitive type in these cases would evidently lead to excessive costs. It would thus be desirable to have available sensors that can be made using techniques of micromachining of semiconductors, consequently having overall dimensions comparable to those of capacitive MEMS sensors, but simpler as regards both the structure of the sensor and the sensing circuit. In addition, also the processes of fabrication should be, as a whole, simple and inexpensive.

BRIEF SUMMARY OF THE INVENTION

The purpose of the present invention is to provide a process for the fabrication of an inertial sensor with failure threshold, which will enable the problems described above to be overcome.

According to an embodiment of the present invention, a process is provided for the fabrication of an inertial sensor with failure threshold, including the step of forming at least one sample element embedded in a sacrificial region on top of a substrate of a semiconductor wafer, the sample element being configured to fracture under a preselected force. The process further includes forming, on top of the sacrificial region, a body connected to the sample element, and etching the sacrificial region, so as to free the body and the sample element.

The process may include the step of making a weakened region of the sample element. The weakened region may be made by forming a narrowed region or notches in the sample element.

The process may include forming a plurality of sample elements, each configured to fracture under the preselected force.

According to an alternative embodiment of the invention, a method for manufacturing an inertial sensor is provided, comprising forming, on a semiconductor substrate, a sample element configured to break under a preselected strain, the sample element having a first end coupled to the substrate, and forming, above the semiconductor substrate, a semiconductor material body coupled to a second end of the sample element. The method may include forming a weakened region on the sample element, with the sample element configured to break at the weakened region under the preselected strain.

According to this embodiment, the sample element may have a T shape, the first end being the cross-bar portion of the T and being coupled to the substrate at extreme ends thereof, the second end being the upright portion of the T.

The method may also include forming an additional sample element having a first end coupled to the substrate, a second end coupled to the semiconductor material body, and configured to break under the preselected strain.

According to another embodiment of the invention, A method of measuring movement of a device is provided, including providing a circuit in the device configured to permanently change the conductive state of a conductive path in the event the device is subjected to an acceleration exceeding a preselected level, applying a potential at first and second ends of the conductive path, and detecting a change in the conductive state of the conductive path.

The method may further include breaking a semiconductor structure through which the conductive path passes in the event the device is subjected to the acceleration. This step may be performed by moving a first semiconductor body relative to a second semiconductor body in response to inertial forces resulting from the acceleration, the semiconductor structure being coupled at a first end thereof to the first body and at a second end to the second body, the movement of the first body causing a flexion of the structure, resulting in the breaking thereof.

The device may be a cell phone, and the preselected level may be selected to correspond to an acceleration caused by a drop of the device to an unyielding surface from a preselected height. The preselected level may also be selected to be equal to or less than an acceleration sufficient to damage the device.

BRIEF DESCRIPTION OF THE SEVERAL VIEWS OF THE DRAWING(S)

For a better understanding of the invention, some embodiments thereof are now described, purely by way of non-limiting examples and with reference to the attached drawings, in which.

DESCRIPTION OF THE INVENTION

Figure 1:
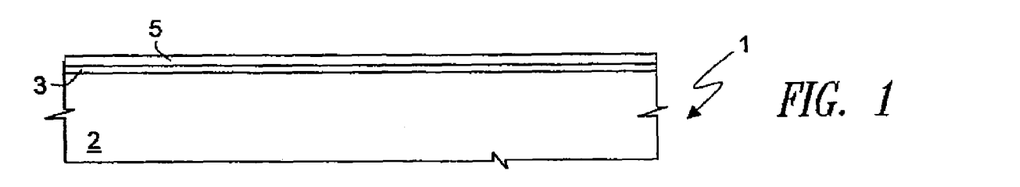
FIGS. 1 and 2 are cross-sectional views through a semiconductor wafer in successive steps of fabrication in a first embodiment of the process according to the present invention.
Figure 2:
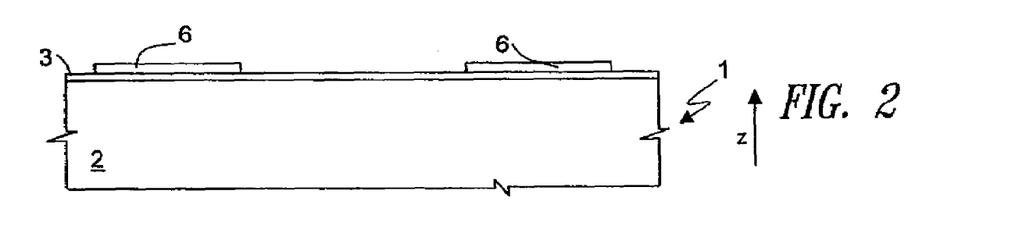
Figure 3:
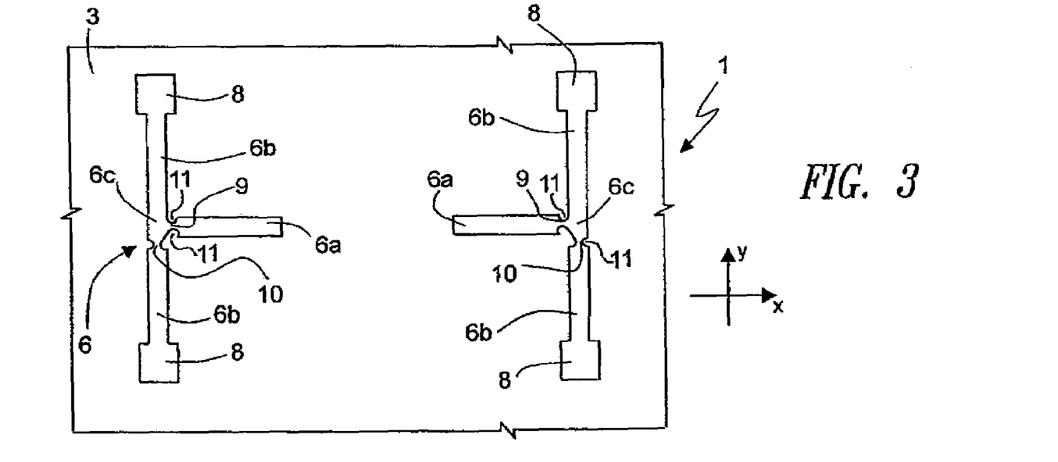
FIG. 3 is a top plan view of the wafer of FIG. 2.
Figure 4:
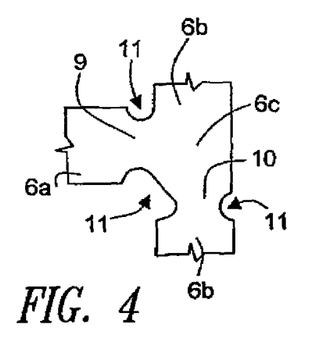
FIG. 4 illustrates an enlarged detail of FIG. 3.

With reference to FIGS. 1-13, a wafer 1 of semiconductor material, for example monocrystalline silicon, comprises a substrate 2, on which a thin pad oxide layer 3, for example 2.5 µm thick, is thermally grown. A conductive layer 5 of polysilicon, having for example a thickness of between 400 and 800 nm and a dopant concentration of $10^{19}$ atoms/cm$^3$, is then deposited on the pad oxide layer 3 and is defined by means of a photolithographic process. Two T-shaped samples 6 are thus obtained, having respective feet 6a, aligned with respect to one another and extending towards one another, and respective arms 6b parallel to one another (FIGS. 2-4). The feet 6a and the arms 6b of each sample 6 are set in directions identified by a first axis X and, respectively, by a second axis Y, which are mutually orthogonal (a third axis Z, orthogonal to the first axis X and the second axis Y, is illustrated in FIG. 2). In addition, at respective ends of the arms 6b of both the samples 6 anchoring pads 8 are made, of a substantially rectangular shape and having a width greater than the arms 6b. As illustrated in FIG. 4, each of the samples 6 has a first weakened region 9 and a second weakened region 10. In particular, in both of the samples 6, the first weakened region 9 and the second weakened region 10 are made as narrowed portions of the foot 6a and, respectively, of one of the arms 6b. In addition, the weakened regions 9, 10 are defined by notches 11 with a circular or polygonal profile, made in an area of joining 6c between the foot 6a and the arms 6b and traversing the sample 6 in a direction parallel to the third axis Z. The thickness of the conductive layer 5 of polysilicon, the dimensions of the feet 6a and of the arms 6b of the samples 6, and the conformation of the weakened regions 9, 10 determine the mechanical resistance to failure of the samples 6 themselves. In particular, acting on the shape and on the dimensions of the notches 11 defining the first weakened region 9 and the second weakened region 10, it is possible to obtain pre-set failure thresholds of the samples 6 along the first, second and third axes X, Y and Z. Preferably, all the mechanical failure thresholds are basically the same.

Figure 5:
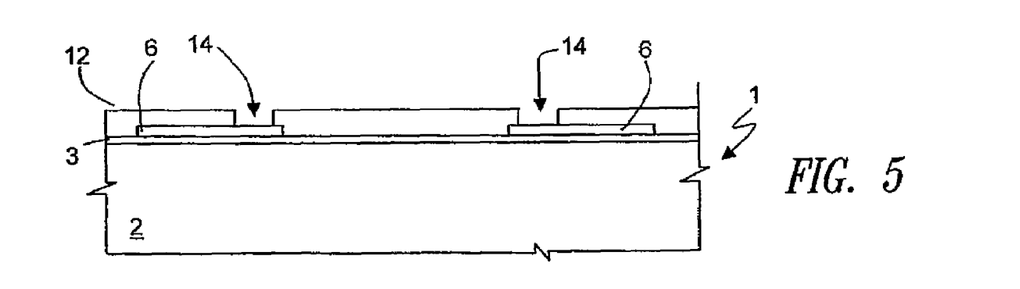
FIG. 5 is a cross-sectional view of the wafer of FIG. 3 in a subsequent fabrication step.
Figure 6:
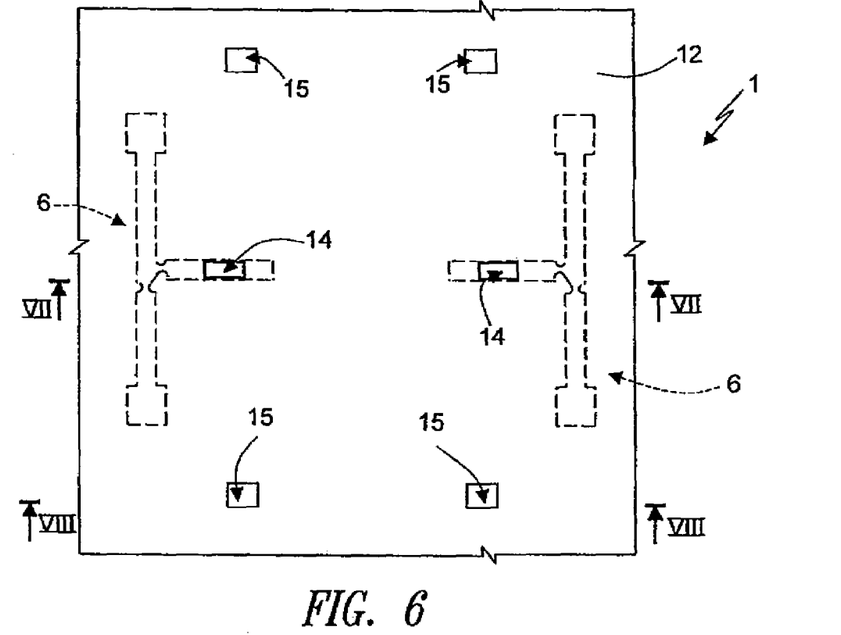
FIG. 6 is a top plan view of the wafer of FIG. 5.

Next, a sacrificial layer 12 of silicon dioxide is deposited so as to coat the pad oxide layer 3 and the samples 6. In practice, the pad oxide layer 3 and the sacrificial layer 12 form a single sacrificial region in which the samples 6 are embedded. The sacrificial layer 12 is then defined by means of a photolithographic process comprising two masking steps. During a first step, first openings 14 are made in the sacrificial layer 12, exposing respective ends of the feet 6a of the samples 6, as illustrated in FIG. 5. In a second step of the photolithographic process (FIG. 6), both the sacrificial layer 12 and the pad oxide layer 3 are selectively etched, so as to make second openings 15, exposing portions of the substrate 2.

Figure 7:
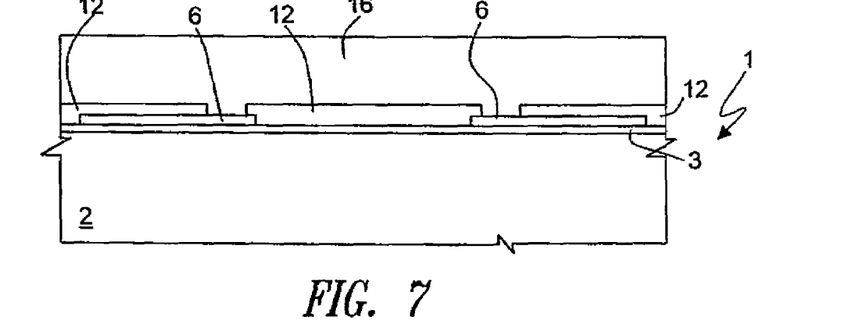
FIGS. 7 and 8 are cross-sectional views of the wafer of FIG. 6 in a subsequent fabrication step, taken along the planes of trace VII-VII and VIII-VIII, respectively, of FIG. 6.
Figure 8:
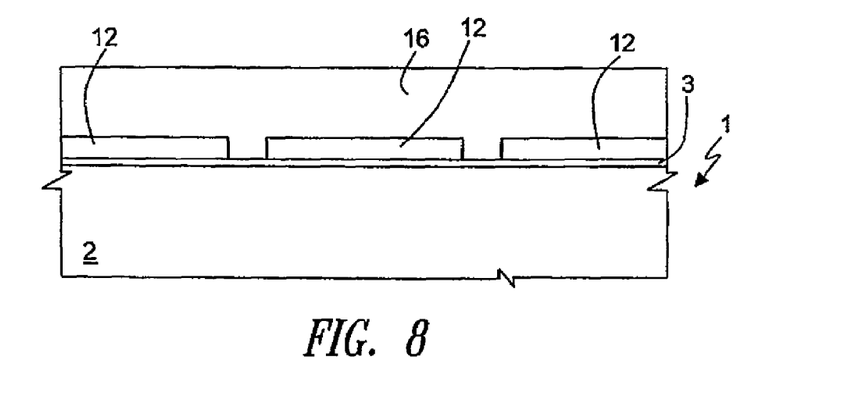

Subsequently, a conductive epitaxial layer 16 is grown on the wafer 1, the said layer having a thickness, for example, of 15 µm and a dopant concentration of $10^{18}$ atoms/cm$^3$. In detail, the epitaxial layer 16 coats the sacrificial layer 12 entirely and extends in depth through the first and the second openings 14, 15 until the samples 6 and the substrate 2, respectively, are reached (FIGS. 7 and 8).

The epitaxial layer 16 is then selectively etched, preferably by reactive-ion etching (RIE), and the sacrificial layer 12 and the pad oxide layer 3 are removed. In greater detail, during the step of etching of the epitaxial layer 16, the following are formed: a mobile mass 18; anchorages 19, provided on the portions of the substrate 2 previously exposed by the second openings 15; a plurality of springs 20, connecting the mobile mass 18 to the anchorages 19; and a ring-shaped supporting structure 21, which surrounds the mobile mass 18, the samples 6, the springs 20, and the corresponding anchorages 19 (see FIG. 9, in which the sacrificial layer 12 and the pad oxide layer 3 have already been removed).

Figure 10:
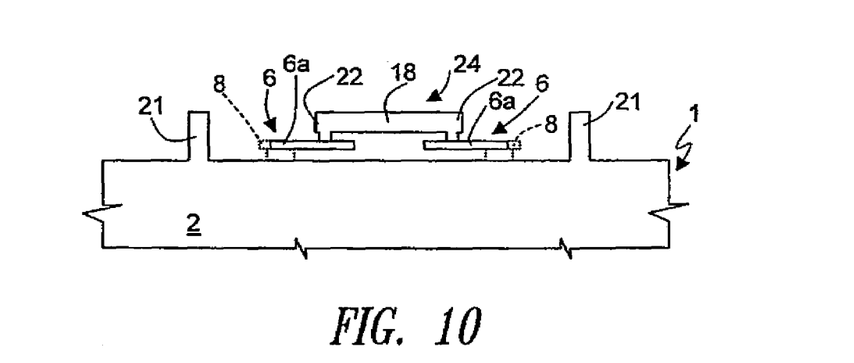
FIGS. 10 and 11 are cross-sectional views of the wafer of FIG. 9, taken along the planes of trace X-X and XI-XI, respectively, of FIG. 9.
Figure 11:
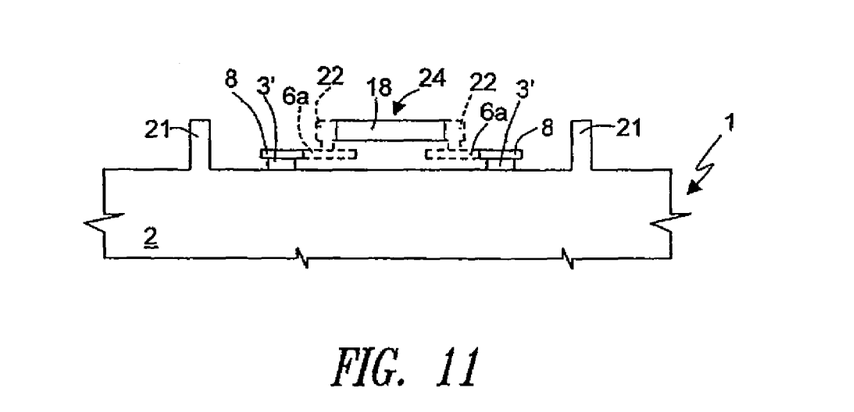

The mobile mass 18 is connected to the substrate 2 by the springs 20, which are in turn constrained to the anchorages 19 (FIG. 11). The springs 20, which are per se known, are shaped so as to enable oscillations of the mobile mass 18 with respect to the substrate 2 along each of the three axes X, Y, Z, at the same time, however, preventing rotations. The mobile mass 18 is moreover constrained to the substrate 2 through the samples 6. In greater detail, the mobile mass 18 has, in a median portion, a pair of anchoring blocks 22, projecting outwards in opposite directions along the second axis Y. The anchoring blocks 22 are connected to the end of the foot 6a of a respective one of the samples 6, as illustrated in FIG. 10. In turn, the samples 6 are anchored to the substrate 2 through the anchoring pads 8. By controlling the duration of etching of the sacrificial layer 12 and of the pad oxide layer 3, the silicon dioxide is in fact removed only partially underneath the anchoring pads 8, which are wider than the feet 6a and the arms 6b of the samples 6; thus, residual portions 3' of the pad oxide layer 3, which are not etched, fix the anchoring pads 8 to the substrate 2, serving as bonding elements.

The sacrificial layer 12 and the remaining portions of the pad oxide layer 3 are, instead, completely removed and, hence, the mobile mass 18 and the samples 6 are freed. In practice, the mobile mass 18 is suspended at a distance on the substrate 2 and can oscillate about a resting position, in accordance with the degrees of freedom allowed by the springs 20 (in particular, it can translate along the axes X, Y and Z). Also the samples 6 are elastic elements, which connect the mobile mass 18 to the substrate 2 in a way similar to the springs 20. In particular, the samples are shaped so as to be subjected to a stress when the mobile mass 18 is outside a relative resting position with respect to the substrate 2. The samples 6 are, however, very thin and have preferential failure points in areas corresponding to the weakened regions 9, 10. For this reason, their mechanical resistance to failure is much lower than that of the springs 20, and they undergo failure in a controlled way when they are subjected to a stress of pre-set intensity.

In practice, at this stage of the process, the mobile mass 18, the substrate 2, the springs 20 with the anchorages 19, and the samples 6 form an inertial sensor 24, the operation of which will be described in detail hereinafter.

Figure 12:
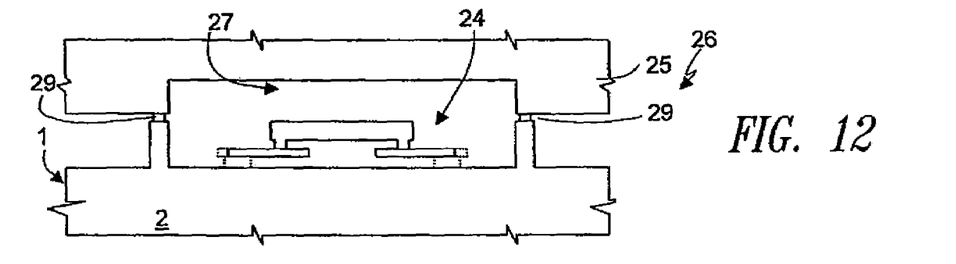
FIGS. 12 and 13 are cross-sectional views through a composite wafer and a die, respectively, obtained starting from the wafer of FIG. 9.
Figure 13:
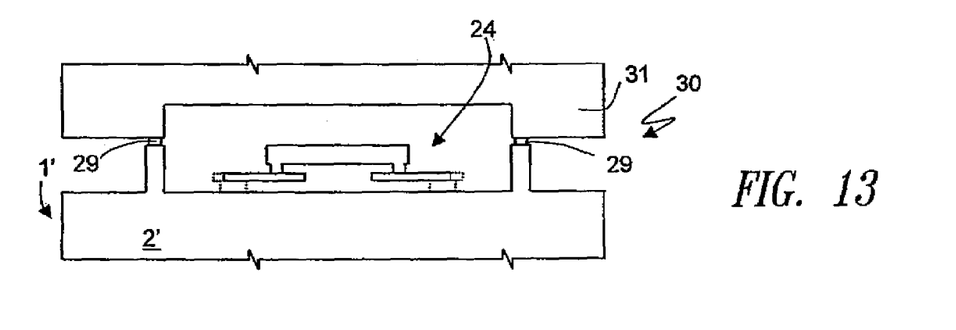

An encapsulation structure 25 for the inertial sensor 24 is then applied on top of the wafer 1, forming a composite wafer 26 (FIG. 12). In particular, the encapsulation structure 25 is an additional semiconductor wafer, in which a recess 27 has previously been opened, in a region that is to be laid on top of the mobile mass 18. The encapsulation structure 25 is coupled to the ring-shaped supporting structure 21 by the interposition of a layer of soldering 29. Next, the compound wafer 26 is cut into a plurality of dice 30, each die comprising an inertial sensor 24 and a respective protective cap 31, formed by the fractioning of the encapsulation structure 25 (FIG. 13).

Figure 14:
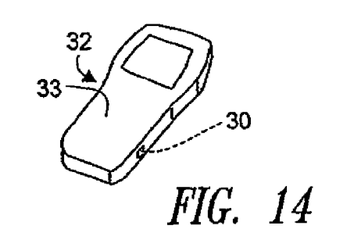
FIG. 14 is a schematic view of the top three quarters of a device incorporating the die of FIG. 13.

The die 30 is finally mounted on a device 32, for example a cell phone. Preferably, the device 32 is provided with a casing 33, inside which the die 30 is fixed, as illustrated in FIG. 14. In addition (FIG. 15), the inertial sensor 24 is connected to terminals of a testing circuit 35, which measures the value of electrical resistance between said terminals. In greater detail, the anchoring pads 8 of the arms 6b, in which the second weakened regions 10 are formed, are connected each to a respective terminal of the testing circuit 35.

Figure 15:
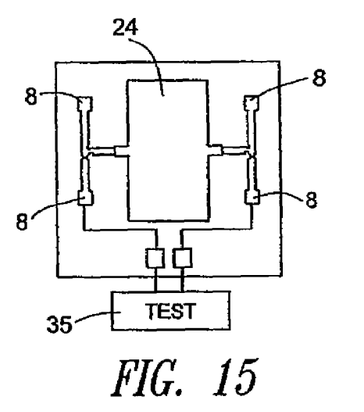
FIG. 15 is a schematic illustration of an inertial sensor of the type illustrated in FIGS. 9-13 in an operative configuration.

In normal conditions, i.e., when the inertial sensor 24 is intact, the samples 6 and the mobile mass 18 form a conductive path that enables passage of current between any given pair of anchoring pads 8. In practice, the testing circuit 35 detects low values of electrical resistance between the anchoring pads 8. During normal use, the device 32 undergoes modest stresses, which cause slight oscillations of the mobile mass 18 about the resting position, without jeopardizing the integrity of the inertial sensor 24.

When the device 32 suffers a shock, the mobile mass 18 of the inertial sensor 24 undergoes a sharp acceleration and subjects the samples 6 and the springs 20 to a force. According to the intensity of the stress transmitted to the inertial sensor 24, said force can exceed one of the thresholds of mechanical failure of the samples 6, which consequently break. In particular, failure occurs at one of the weakened regions 9, 10, which have minimum strength. In either case, the conductive path between the two anchoring pads 8 connected to the testing circuit 35 is interrupted, and hence the testing circuit detects a high value of electrical resistance between its own terminals, thus enabling recognition of the occurrence of events that are liable to damage the device 32.

Figure 16:
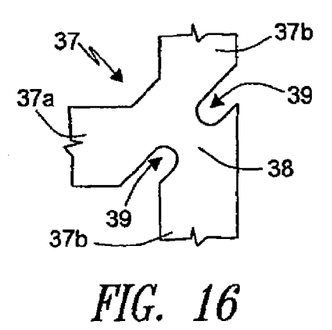
FIG. 16 is a detail of an inertial sensor obtained according to a variant of the first embodiment of the present process.

According to a variant of the embodiment described, shown in FIG. 16, T-shaped samples 37 are provided, which present a single weakened region 38. In particular, the weakened region 38 is a narrowed portion defined by a pair of notches 39, which are oblique with respect to a foot 37a and arms 37b of the samples 37.

Figure 17:
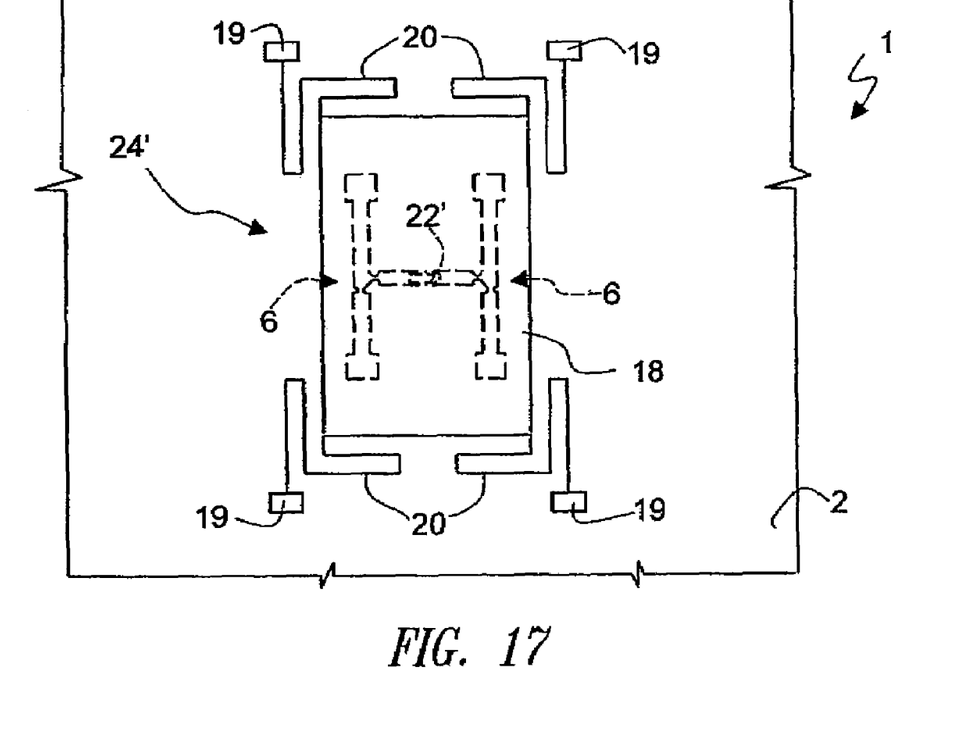
FIG. 17 is a top plan view of an inertial sensor obtained according to a further variant of the first embodiment of the present process.
Figure 18:
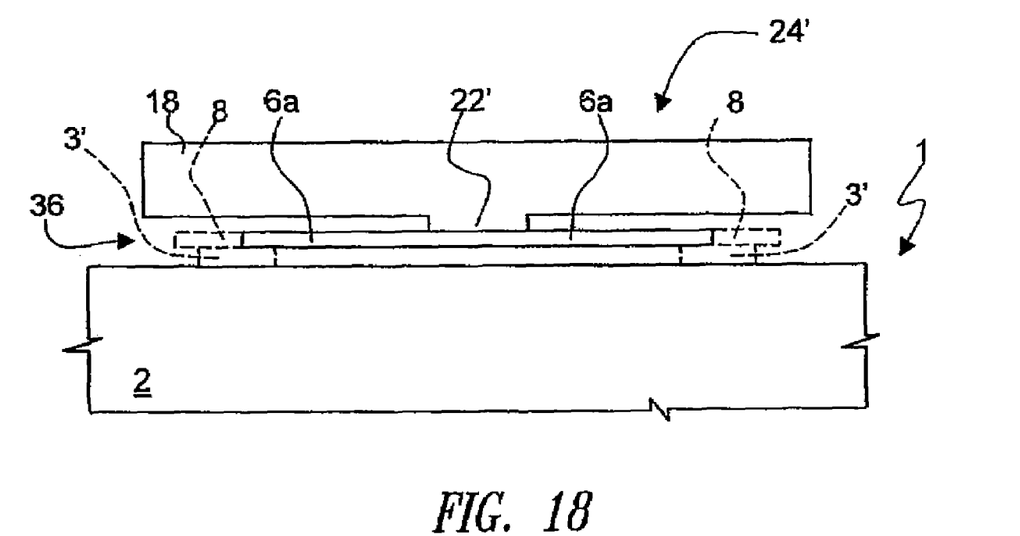
FIG. 18 is a cross-sectional view of the sensor of FIG. 17.

According to a further variant, illustrated in FIGS. 17 and 18, the two T-shaped samples 6 are located in a gap 36 between the substrate 2 and the mobile mass 18 and have the end of the respective feet 6a in mutual contact. In addition, both of the samples 6 are fixed to a single anchoring block 22' set centrally with respect to the mobile mass 18 itself.

The process according to the invention has the following advantages. In the first place, for fabrication of the inertial sensor 24, processing steps that are standard in the microelectronics industry are employed. In particular, the following steps are carried out: steps of deposition of both insulating and conductive layers of material; photolithographic processes; a step of epitaxial growth; and standard steps of etching of the epitaxial silicon and of the insulating layers. Advantageously, a single step of thermal oxidation is carried out, and consequently the wafer 1 is subjected to modest stresses during the fabrication process. The yield of the process is therefore high. In addition, the inertial sensor 24 is obtained starting from a standard, low-cost substrate.

The process described consequently enables inertial sensors with failure threshold to be produced at a very low cost. Such sensors are particularly suitable for use where it is necessary to record the occurrence of stresses that are harmful for a device in which they are incorporated and in which it is superfluous to provide precise measurements of accelerations. For example, they can be advantageously used for verifying the validity of the warranty in the case of widely used electronic devices, such as, for example, cell phones.

In addition, the inertial sensors provided with the present method have contained overall dimensions. In inertial sensors, in fact, large dimensions are generally due to the mobile mass, which must ensure the necessary precision and sensitivity. In this case, instead, it is sufficient that, in the event of a predetermined acceleration, the mobile mass will cause breaking of the weakened regions of the samples, which have low strength. It is consequently evident that also the mobile mass can have contained overall dimensions.

The use of a single anchoring point between the samples and the mobile mass, as illustrated in the second variant of FIGS. 17 and 18, has a further advantage as compared to the ones already pointed out, because it enables more effective relaxation of the stresses due to expansion of the materials. In particular, it may happen that the polysilicon parts which are even only partially embedded in the silicon dioxide (samples and portions of the epitaxial layer) will be subjected to a compressive force, since both the polysilicon, and the oxide tend to a expand in opposite directions during the fabrication process. When the oxide is removed, the action of compression on the polysilicon is eliminated, and the polysilicon can thus expand. Clearly, the largest expansion, in absolute terms, is that of the mobile mass, since it has the largest size. The use of a single anchoring point, instead of two anchorages set at a distance apart enables more effective relaxation of the stresses due to said expansion, since the mobile mass can expand freely, without modifying the load state of the samples.

The inertial sensors obtained using the process described are more advantageous because they respond in a substantially isotropic way to the mechanical stress. In practice, therefore, just one inertial sensor is sufficient to detect forces acting in any direction.

Figures 19, 20, 22:
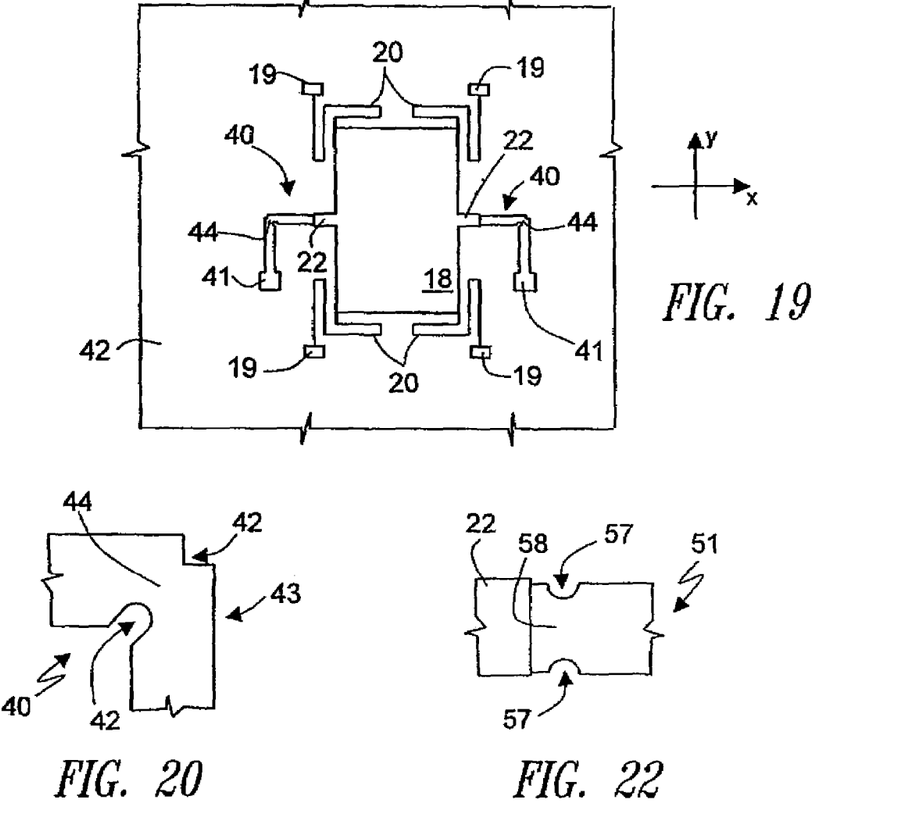
FIG. 19 is a top plan view of an inertial sensor obtained according to a second embodiment of the present invention.
FIG. 20 illustrates an enlarged detail of FIG. 19.
FIG. 22 illustrates an enlarged detail of FIG. 21.

A second embodiment of the invention is illustrated in FIGS. 19 and 20, where parts that are the same as the ones already illustrated are designated by the same reference numbers. According to said embodiment, an inertial sensor 40 is made, having L-shaped samples 41. As in the previous case, the samples 41 are obtained by shaping a conductive polysilicon layer deposited on top of a pad oxide layer (not illustrated herein), which has in turn been grown on the substrate 42 of a semiconductor wafer 43. Using processing steps similar to the ones already described, the mobile mass 18, the anchorages 19 and the springs 20 are subsequently obtained.

In detail, the samples 41 have first ends connected to respective anchoring blocks 22 of the mobile mass 18, and second ends terminating with respective anchoring pads 41 fixed to the substrate 2, as explained previously. In addition, notches 42 made at respective vertices 43 of the samples 41 define weakened regions 44 of the samples 40.

Figure 21:
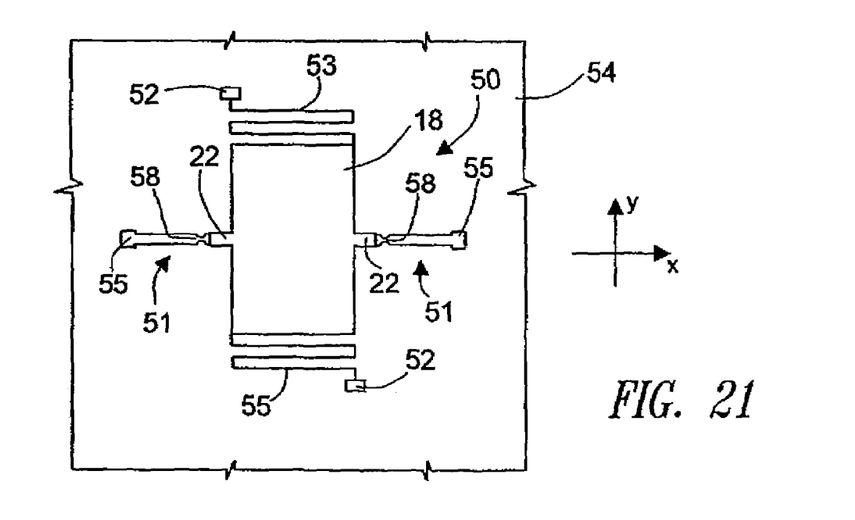
FIG. 21 is a top plan view of an inertial sensor obtained according to a third embodiment of the present invention.

FIGS. 21 and 22 illustrate a third embodiment of the invention, according to which an inertial sensor 50 is obtained, made on a substrate 54 and provided with substantially rectilinear samples 51 that extend parallel to the first axis X. In this case, during the RIE etching step, in addition to the mobile mass 18, two anchorages 52 and two springs 53 of a known type are provided, which connect the mobile mass 18 to the anchorages 52 and are shaped so as to prevent substantially the rotation of the mobile mass 18 itself about the first axis X.

The samples 51 have first ends soldered to respective anchoring blocks 22 of the mobile mass 18 and second ends terminating with anchoring pads 55, made as described previously. In addition, pairs of transverse opposed notches 57 define respective weakened regions 58 along the samples 51 (FIG. 22).

Alternatively, the weakened regions may be absent.

Figure 23:
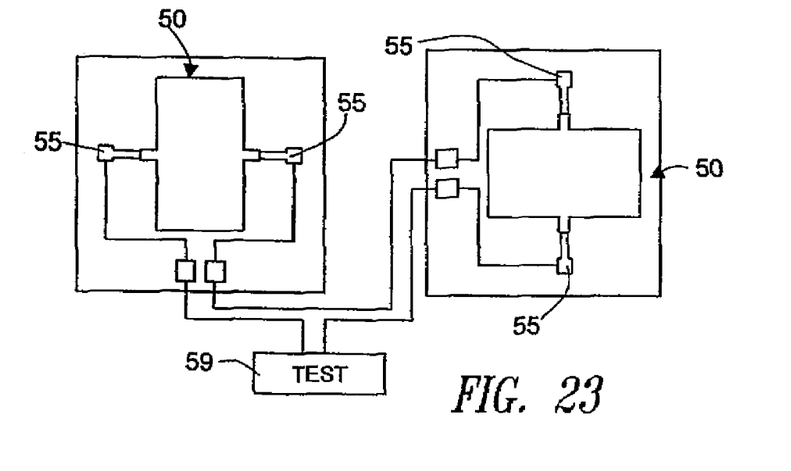
FIG. 23 is a schematic illustration of two inertial sensors of the type illustrated in FIG. 21 in an operative configuration.
Figure 24:
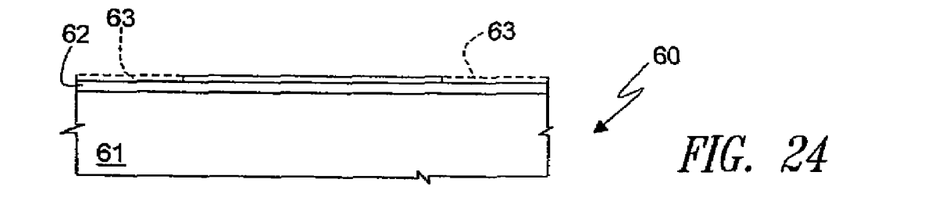
FIG. 24 is a cross-sectional view through a semiconductor wafer in an initial fabrication step of a process according to a fourth embodiment of the present invention.

The inertial sensor 50 responds preferentially to stresses oriented according to a plane orthogonal to the samples 51, i.e., the plane defined by the second axis Y and by the third axis Z. In this case, to detect stresses in a substantially isotropic way, it is possible to use two sensors 50 connected in series between the terminals of a testing circuit 59 and rotated through 900 with respect to one another, as illustrated in FIG. 23.

Figure 25:
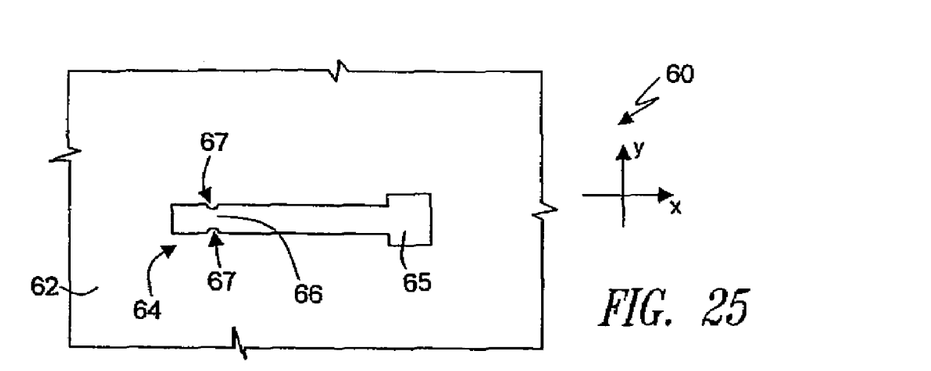
FIG. 25 is a top plan view of the wafer of FIG. 24.

With reference to FIGS. 24-28, according to a fourth embodiment of the invention, a pad oxide layer 62 is grown on a semiconductor wafer 60 having a substrate 61. Next, a conductive layer 63 of polycrystalline silicon (here indicated by a dashed line) is deposited on the pad oxide layer 61 and is defined to form a sample 64, which is substantially rectilinear and extends parallel to the first axis X (FIG. 25). The sample 64 has an anchoring pad 65 at one of its ends and has a weakened region 66 defined by a pair of notches 67 in a central position.

A sacrificial layer 69 of silicon dioxide is deposited so as to coat the entire wafer 60 and is then selectively removed to form an opening 68 at one end of the sample 64 opposite to the anchoring pad 65.

Figure 26:
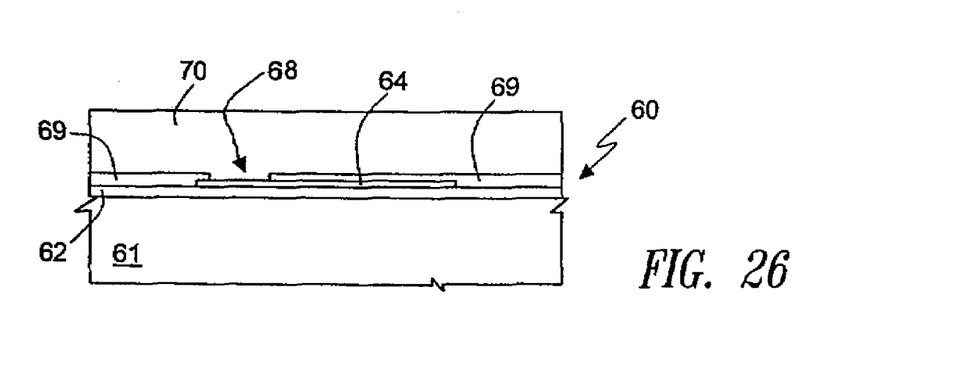
FIG. 26 illustrates the wafer of FIG. 24 in a subsequent fabrication step.
Figure 27:
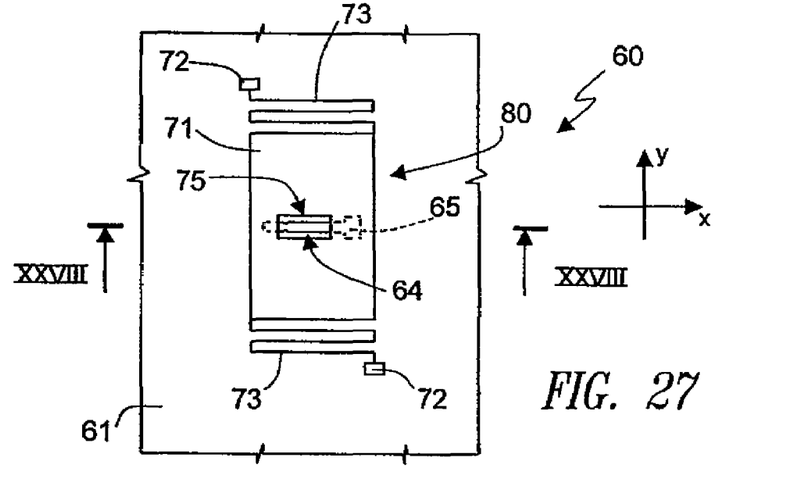
FIG. 27 is a top plan view of the wafer of FIG. 26 in a subsequent fabrication step, in which an inertial sensor is obtained.
Figure 28:
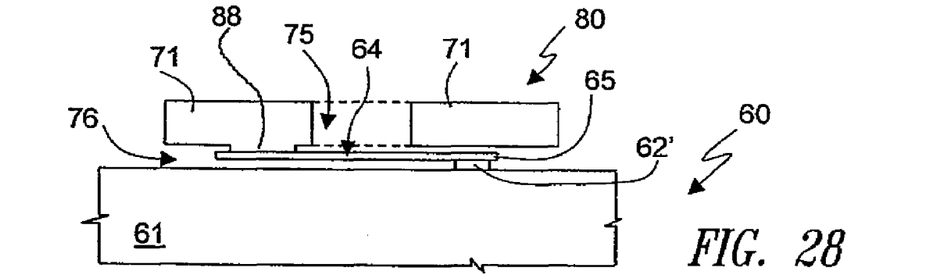
FIG. 28 is a cross-sectional view through the wafer of FIG. 27, taken according to the plane of trace XXVI-XXVI of FIG. 27.

An epitaxial layer 70 is then grown (FIG. 26), which is etched so as to form a mobile mass 71, anchorages 72, springs 73, and a supporting ring (not illustrated for reasons of convenience). The epitaxial layer extends into the opening 68 to form a connection region 88 between the sample 64 and the mobile mass 71. The sacrificial layer 69 and the pad oxide layer 62 are removed, except for a residual portion 62' of the pad oxide layer 62 underlying the anchoring pad 65 (FIGS. 27 and 28). The mobile mass 71 and the sample 64 are thus freed. More precisely, the mobile mass 71, which has, at its center, a through opening 74 on top of the sample 64, is constrained to the substrate 61 through the anchorages 72 and the springs 73, which are shaped so as to prevent any translation along or rotation about the first axis X. In addition, the sample 65 has opposite ends, one connected to the substrate 2 through the anchoring pad 65, and the other to the mobile mass 71 at connection region 88, and is placed in a gap 76 comprised between the mobile mass 71 and the substrate 61.

In this way, an inertial sensor 80 is obtained, which is then encapsulated through steps similar to the ones described with reference to FIGS. 12 and 13.

Also in this case, the use of a single anchoring point between the sample and the mobile mass advantageously enables effective relaxation of the stresses due to expansion of the mobile mass.

Figure 9:
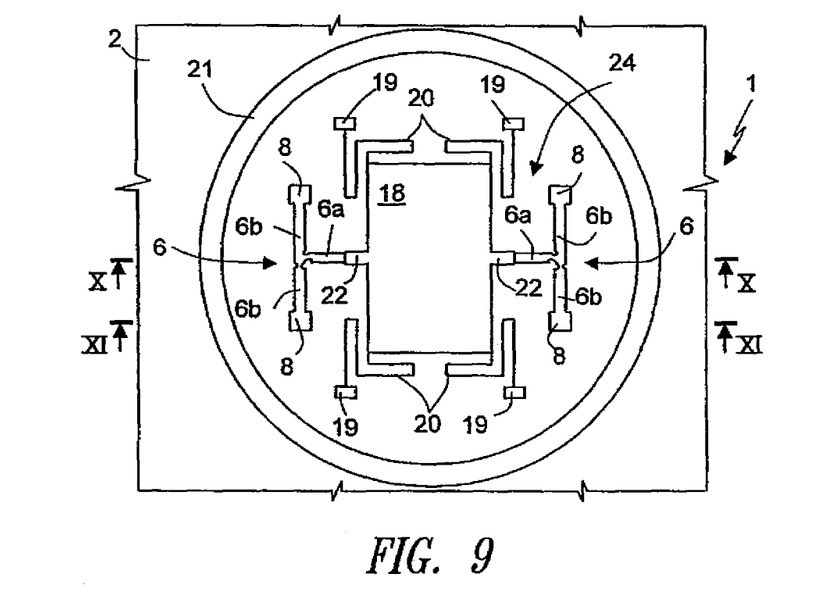
FIG. 9 is a top plan view of the wafer of FIG. 7, in a subsequent fabrication step, in which an inertial sensor is obtained.

According to one variant (not illustrated), the sample is T-shaped, like the ones illustrated in FIG. 9.

Figure 29:
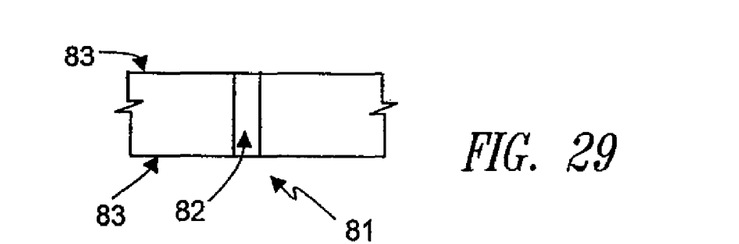
FIG. 29 is a plan view of a detail of an inertial sensor obtained according to a fifth embodiment of the present invention

FIG. 29 illustrates a detail of a sample 81, for example a rectilinear one, of an inertial sensor obtained using a fifth embodiment of the process according to the invention. In particular, the sample 81 has a weakened region defined by a transverse groove 82 extending in a surface of the sample 81 between opposite sides 83 of the sample 81.

Figure 30:
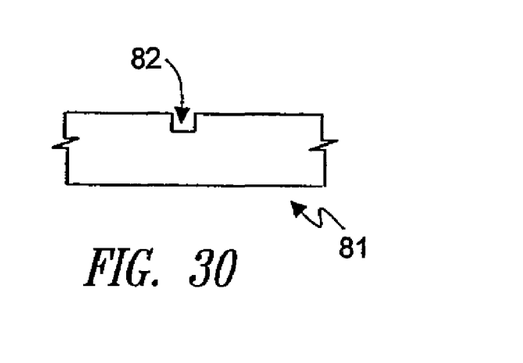
FIG. 30 is a side view of the detail of FIG. 29.

The groove 82 is obtained by means of masked etching of controlled duration of the sample 81 (FIG. 30).

Figure 31:
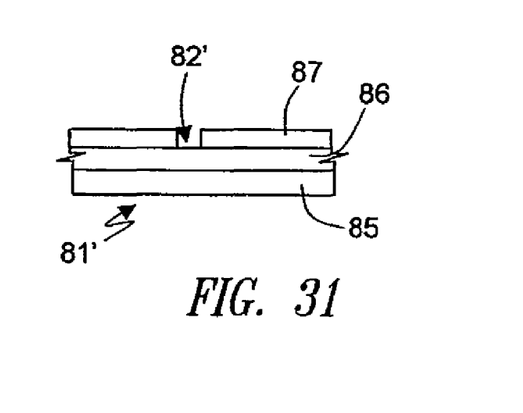
FIG. 31 is a side view of the detail of FIG. 29, obtained according to a variant of the fifth embodiment of the present invention.

Alternatively (FIG. 31), a first layer 85 of polysilicon is deposited and defined. Then, a stop layer 86 of silicon dioxide and a second layer 87 of polysilicon are formed. Finally, a groove 82' is dug by etching the second layer 87 of polysilicon as far as the stop layer 86.

Finally, it is evident that modifications and variations may be made to the process described herein, without thereby departing from the scope of the present invention. In particular, the weakened regions can be defined by using side notches in the samples together with grooves extending between the side notches. In addition, the weakened regions could be defined by through openings that traverse the samples, instead of by side notches.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A process for the fabrication of an inertial sensor with failure threshold, comprising the steps of:
    forming, on top of a substrate of a semiconductor wafer, at least one sample element embedded in a sacrificial region;
    forming, on top of said sacrificial region, a body connected to said sample element; and
    etching said sacrificial region, so as to free said body and said sample element, said sample element being physically breakable, following etching of said sacrificial region, when subjected to a preselected strain.

2. The process according to claim 1, in which the step of forming said sample element comprises:
    forming a first layer of a first material, which coats said substrate;
    forming a second layer of a second material, which coats said first layer;
    shaping said second layer, so as to define said sample element; and
    forming a third layer of said first material coating said first layer and said sample element.

3. The process according to claim 2, in which said first material is a dielectric material and said second material is a conductive material.

4. The process according to claim 3, in which said first material is silicon dioxide and said second material is polysilicon.

5. The process according to claim 1 wherein the step of forming at least one sample element comprises the step of making at least one weakened region of said sample element.

6. The process according to claim 5, in which the step of making at least one weakened region comprises the step of defining a narrowing of said sample element.

7. The process according to claim 6 in which said step of defining a narrowing portion comprises forming notches in edges of said sample element.

8. The process according to claim 5 in which the step of making at least one weakened region comprises making a groove in a surface of said sample element and extending between opposite edges of said sample element.

9. The process according to claim 8, in which the step of making a groove comprises performing an etch of controlled duration of said sample element.

10. The process according to claim 8 in which the step of making a groove comprises:
    forming a stop layer inside said sample element; and
    etching said sample element until said stop element is reached.

11. The process according to claim 1 wherein the step of forming at least one sample element comprises defining at least one anchoring pad of said sample element.

12. The process according to claim 11, in which the step of etching said sacrificial region is interrupted before removing residual portions of said sacrificial region underlying said anchoring pad.

13. The process according to claim 1, further comprising making, before performing the step of forming said body, at least one first opening through said sacrificial region, which exposes one end of said sample element, and making second openings, which expose respective portions of said substrate.

14. The process according to claim 13, in which the step of forming said body comprises:
    growing an epitaxial layer, which extends on top of said sacrificial region and through said first opening and said second openings; and
    etching said epitaxial layer until said sacrificial region is reached.

15. The process according to claim 14, in which, during the step of etching said epitaxial layer there are defined anchorages connected to said substrate and elastic elements connecting said body to said anchorages.

16. A method for manufacturing an inertial sensor, comprising:
    forming, on a semiconductor substrate, a sample element having a first end coupled to the substrate, and
        forming the sample element being configured to physically break under a preselected strain; and
        forming, above the semiconductor substrate, a semiconductor material body coupled to a second end of the sample element.

17. The method of claim 16 wherein the forming the sample element comprises forming the sample element in a T shape, the first end forming a cross-bar portion of the T and being coupled to the substrate at extreme ends of the crossbar, the second end extending from a central portion of the crossbar to form the T.

18. The method of claim 16, further comprising forming an additional sample element having a first end coupled to the substrate, a second end coupled to the semiconductor material body, and configured to break under the preselected strain.

19. The method of claim 16, further comprising forming a weakened region on the sample element, and wherein the sample element is configured to break at the weakened region under the preselected strain.

20. The method of claim 19 wherein the weakened region comprises a narrowed region of the sample element.

21. The process of claim 1, comprising forming, in said sacrificial region, a via over said sample element, and wherein said step of forming the body comprises connecting the body to said sample element through said via.

22. The process of claim 1 wherein said step of forming said sample element comprises forming a plurality of sample elements, of which said sample element is one, each of the plurality of sample elements being coupled at a respective first end to the semiconductor substrate and at a respective second end to said semiconductor material body.

23. The process of claim 1, further comprising forming, in said semiconductor wafer, a test circuit configured to detect a break in said sample element.

24. The method of claim 16, further comprising forming a circuit on the semiconductor substrate, configured to subject the sample element to a voltage such as to cause an electric current to flow through the sample element.

25. The method of claim 24 wherein the circuit is further configured to detect the current flowing in the sample element.

26. A process for the fabrication of an inertial sensor with failure threshold, comprising:
    forming, on top of a substrate of a semiconductor wafer, a conductive sample element coupled at a first end thereof to the substrate and shaped so as to be subject to a stress when a second end thereof is outside a relative resting position with respect to the substrate, and wherein configuring the conductive sample element is configured so as to undergo a physical failure in a controlled way when subjected to a stress of pre-selected intensity; and forming a body connected to the second end of the sample element.

27. The process of claim 26, further comprising forming, in the semiconductor wafer, a test circuit configured to detect a change in electrical resistance of the sample element.

28. The process of claim 26 wherein the step of forming a conductive sample element comprises forming a plurality of sample elements of which the sample element is one, each of the sample element being coupled at respective first ends to the substrate and at respective second ends to the body, and each of the sample elements being configured to undergo failure in a controlled way when subjected to the stress of pre-selected intensity.

29. The process of claim 26 wherein the step of forming a sample element comprises the step of making a weakened region of said sample element.

30. The method of claim 16, comprising forming the semiconductor material body with a mass sufficient that, if the inertial sensor is subjected to a predetermined acceleration, the mobile mass will subject the sample element to the pre-selected strain, causing the sample element to break.

31. The method of claim 16 wherein the forming the sample element comprises forming the sample element in an L shape, and forming the sample element to break at a vertex of the L when the sample element is subjected to the preselected strain.

32. The method of claim 16 wherein the forming the sample element comprises forming the sample element in a rectilinear shape.

33. The method of claim 16, comprising forming a plurality of spring elements, each coupled at a respective first end to the semiconductor substrate and at a respective second end to the semiconductor material body, and forming each of the spring elements to have a mechanical resistance to failure that is greater than that of the sample element.

* * * * *